United States Patent
Gounares et al.

(10) Patent No.: US 10,706,746 B2
(45) Date of Patent: Jul. 7, 2020

(54) PURE BINARY SCRAMBLING

(71) Applicant: Polyverse Corporation, Bellevue, WA (US)

(72) Inventors: Alexander Gounares, Kirkland, WA (US); Christopher Fraser, Seattle, WA (US)

(73) Assignee: Polyverse Corporation, Bellevue, WA (US)

( * ) Notice: Subject to any disclaimer, the term of this patent is extended or adjusted under 35 U.S.C. 154(b) by 14 days.

(21) Appl. No.: 15/996,205

(22) Filed: Jun. 1, 2018

(65) Prior Publication Data

US 2019/0371209 A1    Dec. 5, 2019

(51) Int. Cl.
  *G09C 1/00*    (2006.01)
  *G06F 8/52*    (2018.01)
  *H04L 9/00*    (2006.01)

(52) U.S. Cl.
  CPC ............... *G09C 1/00* (2013.01); *G06F 8/52* (2013.01); *H04L 9/002* (2013.01); *H04L 2209/08* (2013.01); *H04L 2209/12* (2013.01)

(58) Field of Classification Search
  CPC .............. G09C 1/00; G06F 8/52; H04L 9/002
  See application file for complete search history.

(56) References Cited

U.S. PATENT DOCUMENTS

| | | | | |
|---|---|---|---|---|
| 5,903,761 A * | 5/1999 | Tyma | ...................... | G06F 8/445 717/148 |
| 7,287,166 B1 * | 10/2007 | Chang | ...................... | G06F 21/54 713/176 |
| 7,434,213 B1 * | 10/2008 | Prakash | ...................... | G06F 8/41 717/152 |
| 7,631,292 B2 * | 12/2009 | Chen | ...................... | G06F 21/52 713/190 |
| 8,239,836 B1 * | 8/2012 | Franz | ...................... | G06F 11/1487 717/127 |
| 9,448,788 B1 * | 9/2016 | Barua | ...................... | G06F 8/70 |
| 10,412,116 B1 * | 9/2019 | Powers | ...................... | G06F 9/546 |
| 2003/0191940 A1 * | 10/2003 | Sinha | ...................... | G06F 21/52 713/176 |
| 2004/0034851 A1 * | 2/2004 | Ungar | ...................... | G06F 8/53 717/136 |
| 2005/0021966 A1 * | 1/2005 | Chow | ...................... | G06F 21/14 713/176 |
| 2005/0183072 A1 * | 8/2005 | Horning | ...................... | G06F 21/125 717/140 |
| 2006/0031686 A1 * | 2/2006 | Atallah | ...................... | G06F 12/1408 713/190 |
| 2006/0048223 A1 * | 3/2006 | Lee | ...................... | G06F 21/14 726/22 |
| 2007/0039048 A1 * | 2/2007 | Shelest | ...................... | G06F 21/566 726/22 |

(Continued)

OTHER PUBLICATIONS

OSullivan, Retrofitting Security in COTS Software with Binary Rewriting (2011) (Year: 2011).*

(Continued)

*Primary Examiner* — Mahfuzur Rahman
*Assistant Examiner* — Richard W Cruz-Franqui (57) ABSTRACT

The present invention relates to methods and systems for binary scrambling, and applications for cybersecurity technology aimed at preventing cyber-attacks.

1 Claim, 4 Drawing Sheets

(56) References Cited

U.S. PATENT DOCUMENTS

| | | | |
|---|---|---|---|
| 2007/0136561 A1* | 6/2007 | Whalley | G06F 8/441 712/209 |
| 2008/0126766 A1* | 5/2008 | Chheda | G06F 21/55 712/226 |
| 2009/0320129 A1* | 12/2009 | Pan | G06F 21/54 726/22 |
| 2010/0058301 A1* | 3/2010 | Myles | G06F 21/14 717/142 |
| 2010/0332759 A1* | 12/2010 | Vauclair | G06F 21/14 711/125 |
| 2012/0278504 A1* | 11/2012 | Ang | H04L 61/2596 709/246 |
| 2013/0276122 A1* | 10/2013 | Sowder | G06F 21/00 726/24 |
| 2015/0033016 A1* | 1/2015 | Thornton | H04L 63/061 713/171 |
| 2015/0033339 A1* | 1/2015 | Geffner | G06F 21/56 726/23 |
| 2015/0186648 A1* | 7/2015 | Lakhotia | G06F 21/563 726/22 |
| 2015/0347724 A1* | 12/2015 | Torrey | G06F 21/12 713/190 |
| 2017/0149799 A1* | 5/2017 | Vamaraju | H04W 64/00 |
| 2017/0243028 A1* | 8/2017 | LaFever | G06F 21/6263 |
| 2017/0371635 A1* | 12/2017 | Davidson | G06F 8/52 |
| 2018/0198800 A1* | 7/2018 | Krasser | G06F 21/56 |
| 2019/0243964 A1* | 8/2019 | Shukla | G06F 21/54 |

OTHER PUBLICATIONS

Onarlioglu, Kaan, G-Free—Defeating Return-Oriented Programming through Gadget-less Binaries, ACSAC '10 Dec. 6-10, 2010 (Year: 2010).*

NPL Search (InnovationQ) (Year: 2020).*

Onarlioglu, Kaan—G-Free—Defeating Return-Oriented Programming through Gadget-less Binaries (Year: 2010).*

OSullivan—Retrofitting Security in COTS Software with Binary Rewriting (Year: 2011).*

* cited by examiner

System 200

Components 201

Components 202

Figure 3

Compiler 300

301: Register reallocation, and specifically substituting equivalent hardware registers where possible 302: Reordering of functions

303: Introduction of no-ops and other obfuscation code

304: Substitution of alternative instructions to perform semantically equivalent operations 305: Changing the order of evaluation of expressions where it is legal to do so (e.g. commutative operations)

306: Modification and randomization of import tables and other lookup tables

Figure 4

PURE BINARY SCRAMBLING

This U.S. utility patent application is being filed as a Track One patent application.

FIELD OF THE INVENTION

The present invention relates to methods and systems for pure binary scrambling, and applications for cybersecurity technology aimed at preventing cyber-attacks.

BACKGROUND OF THE INVENTION

As the world becomes increasingly digital, and digitally connected, cyber security continues to grow in importance. In today's world, cyber security is unfortunately asymmetric—and it favors the attacker. One fundamental aspect of the asymmetry today is the inherent "break once, run many" nature of contemporary systems.

Today's cybersecurity environment is stymied by asymmetric economics of this "break once, run anywhere" nature. This 'break once, run many' nature makes the economics of cyber-attacks significantly favor the attacker. The effort applied to find and develop and exploit can be leveraged across a large number of targets. Once a vulnerability is found and exploited, it can often be run on millions if not billions of computers. Often times these attacks can be launched remotely from anywhere in the world. To make a cyber-attack worthwhile, the only remaining question is the value of the targeted data or systems.

Malware, or malicious software, is often linked to cyber-attacks. Cyber attackers often take advantage of vulnerabilities in computer programs, and are thus able to infect, damage and often disable the programs with computer viruses, malware and other malicious code. It is worthwhile for attackers to spend significant time engineering malware, and in particular to create viruses that can bypass or otherwise evade traditional cybersecurity defenses like anti-virus, firewalls, and security analytics packages.

One common set of techniques for writing malware uses approaches like return oriented programming (ROP) and jump oriented programming (JOP) to literally trick the target into behaving the way the attacker desires. In essence, the victim becomes the virus. Malware based on these techniques can be extremely hard to detect, and as a result, many "Zero Day" malware attacks are based on these techniques.

Fundamentally, malware based on these techniques requires knowledge of the target system. In simple terms, in order to 'trick' the victim into becoming the virus, the attacker needs to know very specific details about the victim, including but not limited to, the specific binary instructions used by the victim program.

Prior to the present invention, the state of the art to defend against ROP/JOP style attacks was address space layout randomization (ASLR). The goal of this approach is to randomly move binaries into different memory locations, making it more difficult for attackers to know where to find the code needed to create the virus. This approach, while worthwhile, is fairly easy to work around—simply figuring out one number (e.g. a single memory address) is often sufficient to completely defeat ASLR defenses.

There is therefore a long-felt, significant and unmet need in the art for improved methods and systems for preventing and disabling the unwanted effects of malware. As long as targets remain static, attackers will be able to exploit vulnerabilities economically. It is not sufficient to just move binaries around, the binaries themselves need to be different across systems.

SUMMARY OF THE INVENTION

Various aspects of the present invention provide methods and tools for binary scrambling of Commercial, Off-the-Shelf Software (COTS) software. There are many forms of COTS software, and popular products include, but are not limited to, Microsoft Office and Adobe Acrobat. The notable feature of COTS software with respect to this invention is that it is typically distributed in binary (machine executable) form, without the source code.

One aspect of the present invention provides a method of binary scrambling of COTS software, comprising thoroughly scrambling any protected program even if source code is unavailable.

The newly scrambled binary reduces the likelihood of a zero day ROP/JOP style virus successfully exploiting a vulnerable COTS binary from 100% to less than about 1 in 1 billion ($1\times10^{-9}$).

Another aspect of the invention provides wherein the tool is integrated into an existing cyberdefense platform.

Another aspect of the invention provides wherein the tool comprises a disassembler that can reliably roundtrip a binary, or disassemble into some intermediate form and then reassemble.

Another aspect of the invention provides a method of modeling a compilation process wherein one can accurately disassemble a high level program in such a manner to perform scrambling to defeat a cyberattack.

Another aspect of the invention provides a method of binary scrambling of COTS software, comprising the following steps:
(i) performing a disassembling process;
(ii) once accurately disassembled, transforming into an intermediate format;
(iii) applying binary scrambling transformations, to transform back into assembly; and
(iv) compiling into a newly scrambled binary, to a destination, either directly into memory or back to disk.

Another aspect of the invention provides wherein the disassembling process comprises utilizing an emulated virtual machine to assist in describing the disassembling process.

Additional aspects of the invention will become apparent in view of the following description and associated figures.

Still other objects and advantages of preferred embodiments of the present invention will become readily apparent to those skilled in this art from the following detailed description, wherein there is described certain preferred embodiments of the invention, and examples for illustrative purposes.

DESCRIPTION OF PREFERRED EMBODIMENTS

Although the detailed description herein contains many specifics for the purposes of illustration, anyone of ordinary skill in the art will appreciate that many variations and alterations to the following details are within the scope of the invention. Accordingly, the following embodiments of the invention are set forth without any loss of generality to, and without imposing limitations upon, the claimed invention. While embodiments are described in connection with the drawings and related descriptions, there is no intent to limit the scope to the embodiments disclosed herein. On the contrary, the intent is to cover all alternatives, modifications, and equivalents. In alternate embodiments, additional devices, or combinations of illustrated devices, may be added to, or combined, without limiting the scope to the embodiments disclosed herein.

As used herein, the phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise.

Unless defined otherwise, all technical and scientific terms used herein have the same meaning as commonly understood by one of ordinary skill in the art.

As used herein, in accordance with the present invention, the term "compiler" is understood to refer to any program that is operable for compiling into a newly scrambled binary.

As used herein, the term "source file" is understood to refer to any file that contains program instructions or source code, and which can be written using any high-level programming language. A "source program" is intended to refer to any computer program or software program and can include multiple source files. By way of non-limiting example, examples of high-level programming languages include, but are not limited to, C, C++, Pascal, Perl, Cobol, Java, and Python.

In accordance with the present invention, any high-level programming language can be used to write the source program or software, and the high-level programming language has no relation with any specific computer hardware. The present invention can be implemented using any type of compiler and any type of computer hardware system, network system, or other platform. As used herein, the term "computer hardware system" is intended to include all the necessary components of a computer system that are required to "run" or execute a source program, and that allow someone to use the computer. By way of non-limiting example, the hardware components include, but are not limited to, a power supply, motherboard, hard disk, graphics card, Random access memory (RAM), and other hardware components. Additional hardware components can include, for instance, a keyboard, mouse, speakers, etc.

It is contemplated that the methods of the present invention can therefore be implemented by operation of any type of computer system that includes computer components including but not limited to a processor, memory storage devices for the processor, connected display devices and input devices. Furthermore, the methods of the present invention can also be implemented by operation of computer components in a heterogeneous distributed computing environment, including for example one or more remote file servers, computer servers, and/or memory storage devices. Each of these distributed computing components is accessible by the processor via a communication network, which may include, but is not limited to, the Internet.

As used herein, the term "scramble" is intended to include any procedure, method or process that produces, from an initial binary executable, randomized binary output for each file. "Scrambled binary output" or "scrambled binary output data" thus includes, but is not limited to, any form of binary data that is reorganized or reconfigured in a random manner such that the original functionality is either still preserved or could be restored.

As used herein, the terms "binary scrambling" and "pure binary scrambling" are intended to include any method, procedure, or process that can be utilized, performed or implemented to scramble binary output data at the level of a compiler.

The present invention significantly advances the state of the art in cybersecurity with its binary scrambling capabilities. In a preferred embodiment, the present invention works at the binary executable level, and thus the present invention can defend systems where the source code is not available.

Binary Scrambling of COTS Software for Cyberdefense

With most Commercial Off The Shelf applications (COTS), such as those sold by Microsoft Corporation and others, source code is not available. Thus, most COTS software remains extremely vulnerable to zero day malware attacks. To address this vulnerability to malware attacks, one approach is to scramble the binaries of COTS software. This preferably involves taking a binary, disassembling it into some intermediate form, making changes, and then reassembling into binary. However, many popular computing platforms, such as x86 hardware, suffer from something known as the undecideability problem. Put simply, from just a pure binary, it is not possible to accurately modify that binary in all cases and be guaranteed that the binary is semantically equivalent (let alone function properly).

The present invention provides significant advantages and benefits by providing a binary scrambler for COTS software. The present invention represents a quantum leap forward in cybersecurity defense. In accordance with the present invention, any COTS software can be protected, even if those applications are legacy and source code is no longer available, or even if vendors had not yet caught up to modern cyberdefense technologies. These significant advantages of the present invention dramatically improve the cybersecurity landscape. By implementing the present invention's methods of binary scrambling of COTS software, nearly all forms of remote cyberattack become prohibitively expensive for attackers. The present invention's methods of scrambling binaries of COTS software represents a game changing breakthrough for cyberdefense. The present invention also represents a moving target defense technology that makes it prohibitively expensive and complicated for attackers to try to compromise systems, particularly from remote locations.

By way of non-limiting example, the present invention provides a tool that can scramble COTS binaries. This tool can preferably be integrated into an existing cyberdefense platform. This tool preferably creates a new scrambled binary where the likelihood of a zero day ROP/JOP style virus successfully exploiting a vulnerable COTS binary is reduced from 100% to less than about 1 in 1 million ($1\times10^{-6}$). It is preferred that the exact measurement be performed both experimentally as well as through mathematical analysis. The source code level scrambling done by the present invention creates probabilities so rare it is not possible to experimentally verify the numbers.

The present invention overcomes the significant drawbacks and shortcomings of previous attempts to do arbitrary binary scrambling. Previous attempts have typically failed for one of the following reasons:

1. Unstable scrambled binaries. As a consequence of the undecideability problem, not all binary transformations are legal. Thus, some previous attempts failed to reliably transform binaries across a wide enough range of applications to be useful, or the transformations were limited in scope to very simple binary programs versus real world applications. The net result is a system that had too many errors for commercialization.
2. Limited entropy. One way to address the reliability problem above (or alternatively, work around the undecideability problem) is to limit the scope of transformations involved. For example, just a very modest set of register swaps could have been employed. However, limiting the entropy by definition increases the probability that zero day viruses will still succeed.
3. Distribution of scrambled binaries. Another challenge is even with the ability to scramble a binary; how would that binary get into production reliably? How would the binary be serviced (e.g. patched?). These are non-trivial challenges which have been solved by the present invention.

As will be described in more detail below, the present invention has solved the third challenge already around distribution, and the present invention also provides the foundation to solve the first two problems.

With regard to the undecideability problem, in principle it is not possible to 100% accurately disassemble, modify, then reassemble a pure binary program. This problem can be understood simply from the following line of assembly code:

jmp eax

The problem? Register eax at runtime can have any address, and as x86 is takes advantage of multi-byte encoding, data at any address could potentially be a legitimate instruction to execute. And if the address is literally one byte different, the data at that address could also potentially be a legitimate instruction. Out of 256 possible byte values for any given address, 248 of those values decode to a valid instruction or start of an instruction in x86 instruction set.

Of course, there are many more challenges in disassembling pure binary programs, from handling data regions to having hand coded assembly in the program for various optimizations, but the simple jmp eax example illustrates how hard it can be.

In accordance with the present invention, the disassembly challenges are surmountable.

Today, most COTS software is built from high level programming languages. Importantly, the compilers for these languages tend to be very well behaved and very predictable. In view of this predictability, the present invention enables one to understand and model the compilation process sufficiently wherein one can accurately disassemble a high level program with enough information to perform scrambling to defeat cyberattacks.

By way of non-limiting example, the present invention enables one to disassemble a high level program with enough information to accurately reassemble.

By way of further non-limiting example, the present invention provides a disassembler that can reliably roundtrip a binary, or disassemble into some intermediate form and then reassemble.

By way of further non-limiting example, the present invention provides a method of binary scrambling of COTS software, wherein an emulated virtual machine is utilized to assist in providing hints to the disassembling process. In accordance with the present invention, at least one emulated virtual machine can be used to help model a compilation process, and assist in accurately understanding the disassembling process. A modern computer can easily run many virtual machines, and similarly, it can even run virtual machines that emulate a chip's instruction set (e.g. the qemu virtual machine). Thus, for certain methods of binary scrambling of COTS software, the COTS binary can be run in an emulated virtual machine to assist in providing hints to the disassembling process.

According to one preferred embodiment, once accurately disassembled, steps are performed to transform the assembly into a more generic (and shapeable) intermediate format, such as a register transfer language approach (essentially creating a graph of how data flows through registers). A partial disassembly, such as that done in instrumentation and debugging tools such as valgrind, Dynamo Rio, and Dr. Memory, can be utilized. Whichever intermediate representation is chosen, this can be used to apply binary scrambling transformations, and then in turn it would be transformed back into assembly and compiled into the newly scrambled binary.

Figure 1:
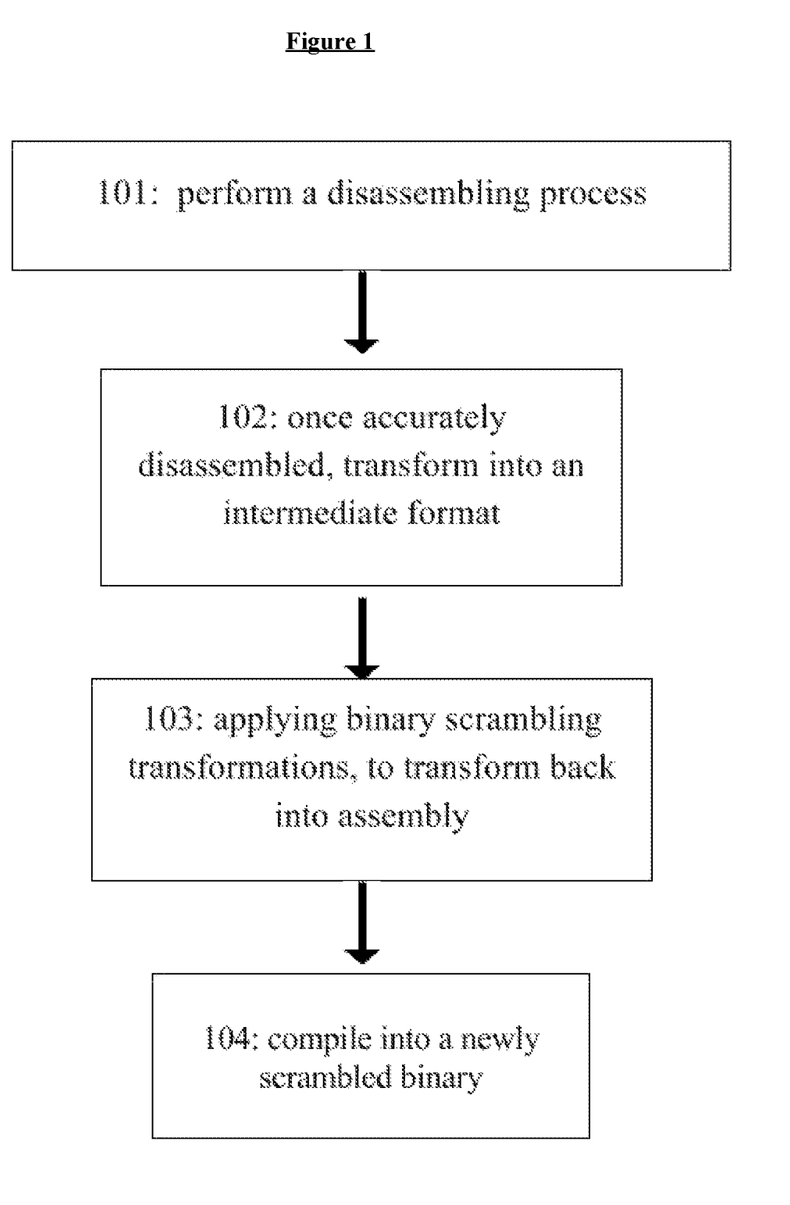
FIG. 1 is a schematic flowchart that depicts one exemplary method of binary scrambling of COTS software, comprising the steps of (i) performing a disassembling process; (ii) once accurately disassembled, transforming into an intermediate format; (iii) applying binary scrambling transformations, to transform back into assembly; and (iv) compiling into a newly scrambled binary.

Referring to FIG. 1, a schematic flowchart depicts one exemplary method of binary scrambling of COTS software. At step 101, a disassembling process is performed. At step 102, once accurately disassembled, transforming occurs into an intermediate format. At step 103, binary scrambling transformations are applied, to transform back into assembly. At step 104, compiling is performed into a newly scrambled binary.

Figure 2:
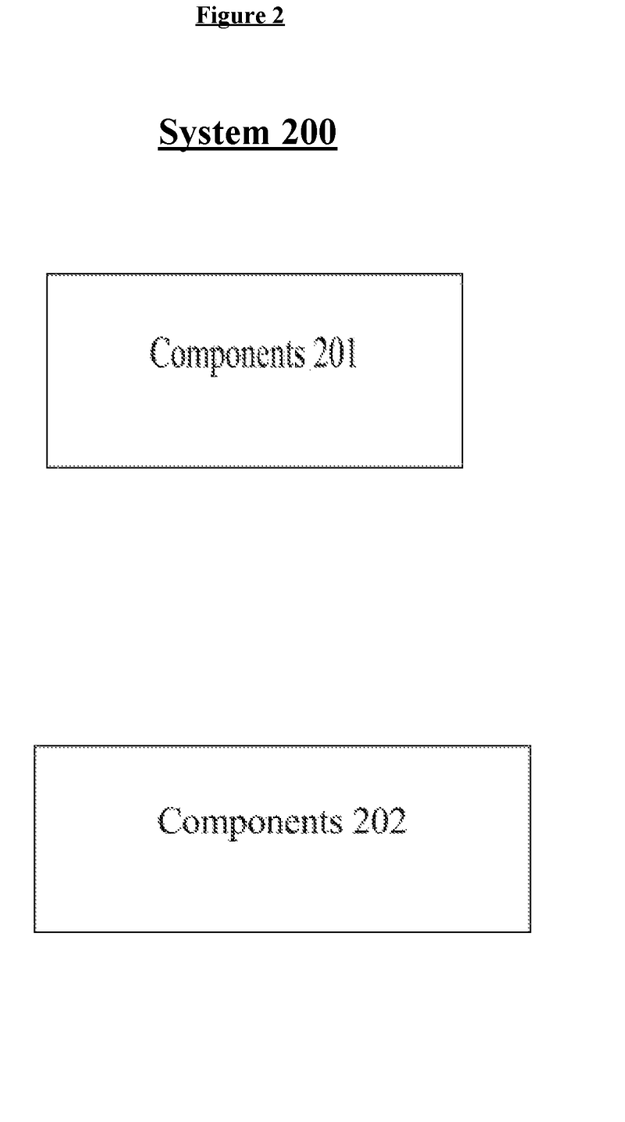
FIG. 2 is a schematic depiction of one embodiment of the invention, comprising a physical, tangible computer hardware system 200 that includes physical, tangible components that are required and essential for performing a method of binary scrambling of COTS software.

Referring to FIG. 2, according to one embodiment, the invention provides a physical, tangible computer hardware system 200 including physical, tangible components 201 that are required and essential for performing a method of binary scrambling of COTS software, wherein said method comprises thoroughly scrambling any protected program where source code is not available, further wherein the scrambling occurs every five seconds or at process launch. According to yet another embodiment of the present invention, the physical, tangible computer hardware system 400 includes physical, tangible components 202 that are required and essential for performing a method of binary scrambling of COTS software, wherein said method comprises thoroughly scrambling any protected program even if source code is unavailable, and further wherein the newly scrambled binary reduces the likelihood of a zero day ROP/JOP style virus successfully exploiting a vulnerable COTS binary from 100% to less than about 1 in 1 billion ($1\times10^{-9}$).

Representative types of binary scrambling transformations are described herein. In accordance with one embodiment of the invention, the scrambled transformations are of arbitrary complexity, and will vary by specific programming language and instruction set of the target computer. These transformations can include, but are not limited to, one or more of the following: register reallocation, reordering of functions, introduction of no-ops and other obfuscation code, substitution of alternative instructions to perform semantically equivalent operations, changing the order of evaluation of expressions where it is legal to do so (e.g. commutative operations), and so forth. The net result of the scrambling is a binary output that performs the same end functionality, but with different steps along the way.

The specific scrambling transformations can preferably include:

1. Register reallocation, and specifically substituting equivalent hardware registers where possible. For example, on x86 based CPU chips, register eax may be used interchangeably with register ebx.
2. Reordering of functions. Traditionally, functions are laid out in a binary file in source code order. In this invention, the layout order is randomized.
3. Introduction of no-ops and other obfuscation code. Dummy code, or chaff, should be inserted in in various locations around the binary to create additional entropy. When chaff code is inserted into reachable areas (i.e. the code could be executed), care should be taken to ensure that it is a no-op—e.g. adding 100 and then subtracting 100 afterwards. Arbitrary code may be inserted in unreachable areas of a binary.
4. Substitution of alternative instructions to perform semantically equivalent operations. For example, multiplication of X by 2 can be substituted with an addition of X+X.
5. Changing the order of evaluation of expressions where it is legal to do so (e.g. commutative operations)
6. Modification and randomization of import tables and other lookup tables. Traditionally these tables are either in source code order or alphabetical; the layout should instead be randomized.

These techniques combined produce a high degree of entropy in the resulting binary. By changing the binary in this fashion, cyberattackers will have to engineer different malware to attack the scrambled binary.

Figure 3:
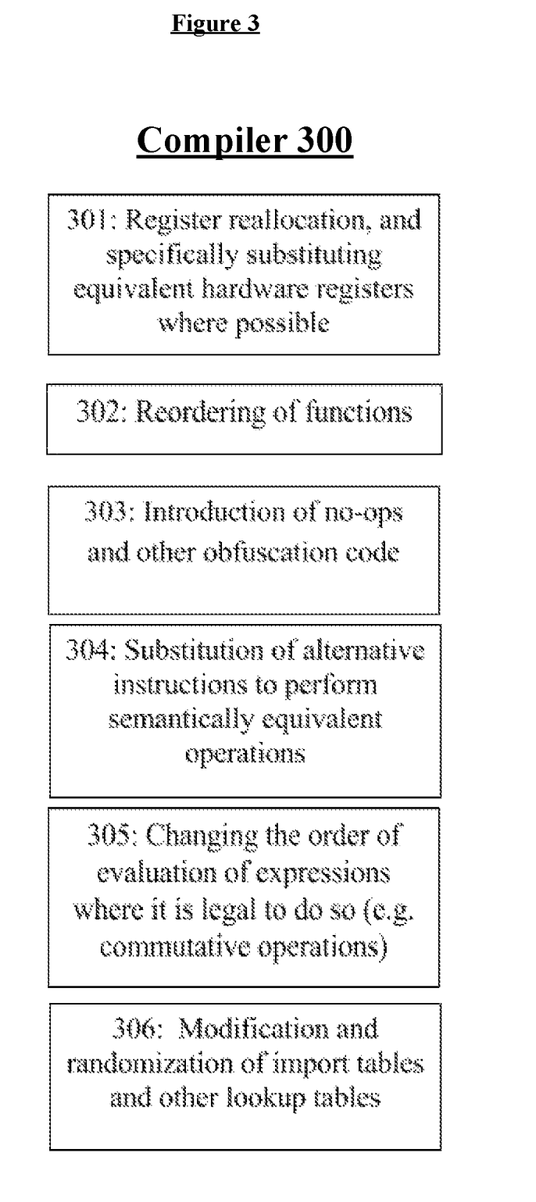
FIG. 3 is a depiction of different representative binary scrambling transformations that can be used in accordance with the present invention

FIG. 3 is a depiction of different representative binary scrambling transformations that can be used in accordance with the present invention. These include, but are not limited to:

Register reallocation, and specifically substituting equivalent hardware registers where possible (reference numeral 301);

Reordering of functions (reference numeral 302);

Introduction of no-ops and other obfuscation code (reference numeral 303);

Substitution of alternative instructions to perform semantically equivalent operations (reference numeral 304);

Changing the order of evaluation of expressions where it is legal to do so (e.g. commutative operations) (reference numeral 305); and Modification and randomization of import tables and other lookup tables (reference numeral 306).

Various aspects of the present invention provide methods and tools for binary scrambling of Commercial, Off-the-Shelf Software (COTS) software. There are many forms of COTS software, and popular products include, but are not limited to, Microsoft Office and Adobe Acrobat. The notable feature of COTS software with respect to this invention is that it is typically distributed in binary (machine executable) form, without the source code.

Figure 4:
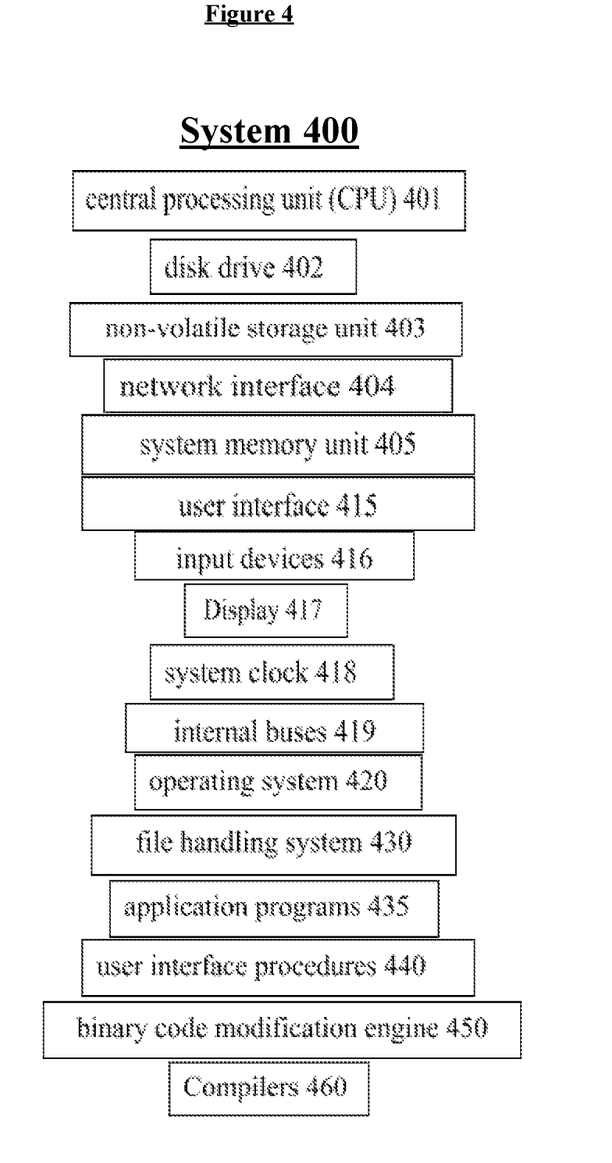
FIG. 4 depicts a representative system that can be used in accordance with the present invention.

As described herein, the present invention can be implemented using any type of compiler and any type of computer hardware system, network system, or other platform. A representative system, such as a workstation or personal computer, can be used for practicing the present invention. As shown in FIG. 4, a representative system 400 that can be used in accordance with the invention includes one or more of the following: a central processing unit (CPU) 401; an optical and/or magnetic disk drive 402 for reading from and/or writing to CDs, diskettes, or other storage media; a non-volatile storage unit 403, such as a hard disk drive, for storing data and program files; a network interface 404 for connecting computer system 400 to a network such as the Internet; a system memory unit 405, preferably including both high-speed read only memory (ROM) and random access memory (RAM), for storing, e.g., data, system control programs, and application programs loaded from disk drive 402, storage unit 403, and/or network interface 404, such programs including programs incorporating computer code that embodies or implements aspects of the present invention; a user interface 415, including one or more input devices 416 and a display 417; a system clock 418; and one or more internal buses 419 for interconnecting the elements of the system 400. The operation of the system 400 is preferably controlled primarily by programs stored in system memory (e.g., RAM) and executed by CPU 401. These programs could include an operating system 420; a file handling system 430; one or more application programs 435; a set of user interface procedures 440; a binary code modification engine 450 for modifying and/or rearranging binary code and for applying scrambling transformations and obfuscation transformations; and one or more compilers 460 as described herein, and a binary scrambling component for generating the scrambled binary output. It should be appreciated that while FIG. 4 sets forth an exemplary system for practicing embodiments of the present invention, other systems with different architectures and different configurations of subsystems could also be used. For example, embodiments of the present invention can be practiced using only a limited subset of the components shown in FIG. 4. Accordingly, it should be understood that the system shown in FIG. 4 is intended to be illustrative and not limiting.

To achieve desired compiler optimization, the specific computer architecture or microarchitecture can be selected as desired. For example, the number of registers can be increased to make it easier for the compiler to allocate registers.

According to one embodiment of the present invention, the invention provides a method of binary scrambling of COTS software, comprising the following steps:

(i) performing a disassembling process, either from an on disk image or as a binary is being loaded into memory;

(ii) once accurately disassembled, transforming into an intermediate format;

(iii) applying binary scrambling transformations, to transform back into assembly; and (iv) compiling into a newly scrambled binary.

According to one representative preferred embodiment, the present invention comprises a physical, tangible, non-abstract computer hardware system that is essential and required for implementing a method of binary scrambling of COTS software, comprising the following steps:

(i) carrying out physical, non-abstract computerized operations by operation of the physical, tangible, non-abstract computer hardware system, wherein said operations are required and necessary for performing a disassembling process;

(ii) once accurately disassembled, carrying out additional physical, non-abstract computerized operations by operation of the physical, tangible, non-abstract computer hardware system, wherein said operations are required and necessary for transforming into an intermediate format;

(iii) carrying out additional physical, non-abstract computerized operations by operation of the physical, tangible, non-abstract computer hardware system, wherein said operations are required and necessary for applying binary scrambling transformations, to transform back into assembly, further wherein the binary scrambling transformations comprise register reallocation, and substituting equivalent hardware registers where possible, reordering of functions, introduction of no-ops and other obfuscation code, substitution of alternative instructions to perform semantically equivalent operations, changing the order of evaluation of expressions where it is legal to do so, further comprising commutative operations, and modification and randomization of import tables and other lookup tables; and (iv) carrying out additional physical, non-abstract computerized operations by operation of a compiler, wherein said compiler is required and necessary for compiling into a newly scrambled binary, further wherein the binary data for each file is scrambled at the level of the compiler, further wherein the physical, tangible, non-abstract computer hardware system is essential and required for implementing one or more scrambling algorithms that are operable for performing binary scrambling, and to scramble the binary data for each separate file that is compiled; further wherein said physical, non-abstract computerized operations are implemented in one or more of a physical, tangible, non-abstract apparatus, system, device, computer, database, and computer readable medium; and further wherein the physical, non-abstract computerized operations are implemented by a physical, tangible computer hardware system in a physical, non-abstract heterogeneous distributed computing environment, wherein said physical, non-abstract heterogeneous distributed computing environment comprises one or more physical, non-abstract remote file servers, one or more physical, non-abstract computer servers, and/or one or more physical, non-abstract memory storage devices, and further wherein each of these distributed computing components is accessible by a processor via a physical, non-abstract communication network;

and further wherein the system requires operation of at least one physical component of computer hardware architecture or microarchitecture which is absolutely and unequivocally essential and required to specifically perform computer operations for the register reallocation;

and further wherein the system requires operation of at least one physical component of computer hardware architecture or microarchitecture which is absolutely and unequivocally essential and required to specifically perform computer operations for substituting equivalent hardware registers where possible;

and further wherein the system requires operation of at least one physical component of computer hardware architecture or microarchitecture which is absolutely and unequivocally essential and required to specifically perform computer operations for the reordering of functions;

and further wherein the system requires operation of at least one physical component of computer hardware architecture or microarchitecture which is absolutely and unequivocally essential and required to specifically perform computer operations for the introduction of no-ops and other obfuscation code;

and further wherein the system requires operation of at least one physical component of computer hardware architecture or microarchitecture which is absolutely and unequivocally essential and required to specifically perform computer operations for the substitution of alternative instructions to perform semantically equivalent operations;

and further wherein the system requires operation of at least one physical component of computer hardware architecture or microarchitecture which is absolutely and unequivocally essential and required to specifically perform computer operations for changing the order of evaluation of expressions where it is legal to do so;

and further wherein the system requires operation of at least one physical component of computer hardware architecture or microarchitecture which is absolutely and unequivocally essential and required to specifically perform computer operations for the commutative operations; and and further wherein the system requires operation of at least one physical component of computer hardware architecture or microarchitecture which is absolutely and unequivocally essential and required to specifically perform computer operations for the modification and randomization of import tables and other lookup tables and further wherein the physical, tangible, non-abstract computer hardware system comprises one or more of a central processing unit, an optical and/or magnetic disk drive for reading from and/or writing to CDs, diskettes, or other storage media, a non-volatile storage unit for storing data and program files, a network interface for connecting the system to a network, a system memory unit comprising both high-speed read only memory (ROM) and random access memory (RAM) for storing data, system control programs, and application programs loaded from a disk drive, a storage unit, and a network interface, a user interface, comprising one or more input devices and a display, a system clock and one or more internal buses for interconnecting the elements of the system, and further wherein the operation of the system is controlled primarily by programs stored in system memory and executed by CPU, and further wherein these programs comprise one or more of an operating system, a file handling system, and one or more application programs, a set of user interface procedures, a binary code modification engine for modifying and/or rearranging binary code and for applying scrambling transformations and obfuscation transformations, and one or more compilers, and further comprising at least one binary scrambling component for generating the scrambled binary output; and further wherein the physical, tangible, non-abstract computer hardware system is essential and required for providing security and protection against attacks by malware and computer viruses, and further wherein the system provides further security against Zero Day Malware.

According to one embodiment, the invention provides a method of binary scrambling of COTS software, comprising thoroughly scrambling any protected program where source code is not available, wherein the scrambling occurs every five seconds or at process launch.

Another embodiment of the present invention provides a method of binary scrambling of COTS software, comprising thoroughly scrambling any protected program even if source code is unavailable.

According to one embodiment of the present invention, the newly scrambled binary reduces the likelihood of a zero day ROP/JOP style virus successfully exploiting a vulnerable COTS binary from 100% to less than about 1 in 1 billion ($1 \times 10^{-9}$).

According to one embodiment of the present invention, the invention provides wherein the tool is integrated into an existing cyberdefense platform.

According to one embodiment of the present invention, the invention provides wherein the tool comprises a disassembler that can reliably roundtrip a binary, or disassemble into some intermediate form and then reassemble.

According to one embodiment of the present invention, the invention provides a method of modeling a compilation process wherein one can accurately disassemble a high level program in such a manner to perform scrambling to defeat a cyberattack.

According to one embodiment of the present invention, the invention provides wherein the disassembling process comprises utilizing an emulated virtual machine to assist in describing the disassembling process.

By way of non-limiting example, the methods and systems of the present invention are very effective in reducing, disabling and/or eliminating the unwanted effects of viruses, malware and other malicious code.

Representative Embodiment of the Invention

According to one representative preferred embodiment, the present invention comprises a physical, tangible, non-abstract computer hardware system that is essential and required for implementing a method of binary scrambling of COTS software, comprising the following steps:

(i) carrying out physical, non-abstract computerized operations by operation of the physical, tangible, non-abstract computer hardware system, wherein said operations are required and necessary for performing a disassembling process;

(ii) once accurately disassembled, carrying out additional physical, non-abstract computerized operations by operation of the physical, tangible, non-abstract computer hardware system, wherein said operations are required and necessary for transforming into an intermediate format;

(iii) carrying out additional physical, non-abstract computerized operations by operation of the physical, tangible, non-abstract computer hardware system, wherein said operations are required and necessary for applying binary scrambling transformations, to transform back into assembly, further wherein the binary scrambling transformations comprise register reallocation, substituting equivalent hardware registers where possible, reordering of functions, introduction of no-ops and other obfuscation code, substitution of alternative instructions to perform semantically equivalent operations, changing the order of evaluation of expressions where it is legal to do so, further comprising commutative operations, and modification and randomization of import tables and other lookup tables;

(iv) carrying out additional physical, non-abstract computerized operations by operation of a compiler, wherein said compiler is required and necessary for compiling into a newly scrambled binary, further wherein the binary data for each file is scrambled at the level of the compiler, further wherein the physical, tangible, non-abstract computer hardware system is essential and required for implementing one or more scrambling algorithms that are operable for performing binary scrambling, and to scramble the binary data for each separate file that is compiled; further wherein said physical, non-abstract computerized operations are implemented in one or more of a physical, tangible, non-abstract apparatus, system, device, computer, database, and computer readable medium;

further wherein the physical, non-abstract computerized operations are implemented by a physical, tangible computer hardware system in a physical, non-abstract heterogeneous distributed computing environment, wherein said physical, non-abstract heterogeneous distributed computing environment comprises one or more physical, non-abstract remote file servers, one or more physical, non-abstract computer servers, and/or one or more physical, non-abstract memory storage devices, and further wherein each of these distributed computing components is accessible by a processor via a physical, non-abstract communication network;

further wherein the system requires operation of at least one physical component of computer hardware architecture or microarchitecture which is absolutely and unequivocally essential and required to specifically perform computer operations for the register reallocation;

and further wherein the system requires operation of at least one physical component of computer hardware architecture or microarchitecture which is absolutely and unequivocally essential and required to specifically perform computer operations for substituting equivalent hardware registers where possible;

and further wherein the system requires operation of at least one physical component of computer hardware architecture or microarchitecture which is absolutely and unequivocally essential and required to specifically perform computer operations for the reordering of functions;

further wherein the system requires operation of at least one physical component of computer hardware architecture or microarchitecture which is absolutely and unequivocally essential and required to specifically perform computer operations for the introduction of no-ops and other obfuscation code;

further wherein the system requires operation of at least one physical component of computer hardware architecture or microarchitecture which is absolutely and unequivocally essential and required to specifically perform computer operations for the substitution of alternative instructions to perform semantically equivalent operations;

further wherein the system requires operation of at least one physical component of computer hardware architecture or microarchitecture which is absolutely and unequivocally essential and required to specifically perform computer operations for changing the order of evaluation of expressions where it is legal to do so;

further wherein the system requires operation of at least one physical component of computer hardware architecture or microarchitecture which is absolutely and unequivocally essential and required to specifically perform computer operations for the commutative operations;

further wherein the system requires operation of at least one physical component of computer hardware architecture or microarchitecture which is absolutely and unequivocally essential and required to specifically perform computer operations for the modification and randomization of import tables and other lookup tables;

further wherein the physical, tangible, non-abstract computer hardware system comprises one or more of a central processing unit, an optical and/or magnetic disk drive for reading from and/or writing to CDs, diskettes, or other storage media, a non-volatile storage unit for storing data and program files, a network interface for connecting the system to a network, a system memory unit comprising both high-speed read only memory (ROM) and random access memory (RAM) for storing data, system control programs, and application programs loaded from a disk drive, a storage unit, and a network interface, a user interface, comprising one or more input devices and a display, a system clock and one or more internal buses for interconnecting the elements of the system, and further wherein the operation of the system is controlled primarily by programs stored in system memory and executed by CPU, and further wherein these programs comprise one or more of an operating system, a file handling system, and one or more application programs, a set of user interface procedures, a binary code modification engine for modifying and/or rearranging binary code and for applying scrambling transformations and obfuscation transformations, and one or more compilers, and further comprising at least one binary scrambling component for generating the scrambled binary output;

further wherein the physical, tangible, non-abstract computer hardware system is essential and required for providing security and protection against attacks by malware and computer viruses, and further wherein the system provides further security against Zero Day Malware;

further wherein the physical, tangible, non-abstract computer hardware system is essential and required for operation of a method of binary scrambling of COTS software, comprising thoroughly scrambling any protected program where source code is not available, further wherein the scrambling occurs every five seconds or at process launch;

further wherein the physical, tangible, non-abstract computer hardware system is essential and required for operation of a method of binary scrambling of COTS software, comprising thoroughly scrambling any protected program even if source code is unavailable;

further wherein the physical, tangible, non-abstract computer hardware system is essential and required for operation of a method of binary scrambling of COTS software, wherein the newly scrambled binary reduces the likelihood of a zero day ROP/JOP style virus successfully exploiting a vulnerable COTS binary from 100% to less than about 1 in 1 billion ($1 \times 10^{-9}$);

further wherein the physical, tangible, non-abstract computer hardware system further comprises at least one tool that is integrated into an existing cyberdefense platform, further wherein the tool comprises a disassembler that can reliably roundtrip a binary, or disassemble into some intermediate form and then reassemble;

further wherein the physical, tangible, non-abstract computer hardware system is essential and required for operation of a method of modeling a compilation process wherein one can accurately disassemble a high level program in such a manner to perform scrambling to defeat a cyberattack;

further wherein the physical, tangible, non-abstract computer hardware system is essential and required for operation of a disassembling process, further wherein the disassembling process comprises utilizing an emulated virtual machine to assist in describing the disassembling process; and further wherein the physical, tangible, non-abstract computer hardware system is essential and required for reducing, disabling and/or eliminating the unwanted effects of viruses, malware and other malicious code.

According to another embodiment, the present invention provides a method of binary scrambling of COTS software, comprising operation of a physical, tangible, non-abstract computer hardware system that is essential and required for implementing the method of binary scrambling of COTS software, wherein the method comprises:

(i) carrying out physical, non-abstract computerized operations by operation of the physical, tangible, non-abstract computer hardware system, wherein said operations are required and necessary for performing a disassembling process;

(ii) once accurately disassembled, carrying out additional physical, non-abstract computerized operations by operation of the physical, tangible, non-abstract computer hardware system, wherein said operations are required and necessary for transforming into an intermediate format;

(iii) carrying out additional physical, non-abstract computerized operations by operation of the physical, tangible, non-abstract computer hardware system, wherein said operations are required and necessary for applying binary scrambling transformations, to transform back into assembly, further wherein the binary scrambling transformations comprise register reallocation, substituting equivalent hardware registers where possible, reordering of functions, introduction of no-ops and other obfuscation code, substitution of alternative instructions to perform semantically equivalent operations, changing the order of evaluation of expressions where it is legal to do so, further comprising commutative operations, and modification and randomization of import tables and other lookup tables;

(iv) carrying out additional physical, non-abstract computerized operations by operation of a compiler, wherein said compiler is required and necessary for compiling into a newly scrambled binary, further wherein the binary data for each file is scrambled at the level of the compiler, further wherein the physical, tangible, non-abstract computer hardware system is essential and required for implementing one or more scrambling algorithms that are operable for performing binary scrambling, and to scramble the binary data for each separate file that is compiled; further wherein said physical, non-abstract computerized operations are implemented in one or more of a physical, tangible, non-abstract apparatus, system, device, computer, database, and computer readable medium;

further wherein the physical, non-abstract computerized operations are implemented by a physical, tangible computer hardware system in a physical, non-abstract heterogeneous distributed computing environment, wherein said physical, non-abstract heterogeneous distributed computing environment comprises one or more physical, non-abstract remote file servers, one or more physical, non-abstract computer servers, and/or one or more physical, non-abstract memory storage devices, and further wherein each of these distributed computing components is accessible by a processor via a physical, non-abstract communication network;

further wherein the system requires operation of at least one physical component of computer hardware architecture or microarchitecture which is absolutely and unequivocally essential and required to specifically perform computer operations for the register reallocation;

further wherein the system requires operation of at least one physical component of computer hardware architecture or microarchitecture which is absolutely and unequivocally essential and required to specifically perform computer operations for substituting equivalent hardware registers where possible;

further wherein the system requires operation of at least one physical component of computer hardware architecture or microarchitecture which is absolutely and unequivocally essential and required to specifically perform computer operations for the reordering of functions;

further wherein the system requires operation of at least one physical component of computer hardware architecture or microarchitecture which is absolutely and unequivocally essential and required to specifically perform computer operations for the introduction of no-ops and other obfuscation code;

further wherein the system requires operation of at least one physical component of computer hardware architecture or microarchitecture which is absolutely and unequivocally essential and required to specifically perform computer operations for the substitution of alternative instructions to perform semantically equivalent operations;

further wherein the system requires operation of at least one physical component of computer hardware architecture or microarchitecture which is absolutely and unequivocally essential and required to specifically perform computer operations for changing the order of evaluation of expressions where it is legal to do so;

further wherein the system requires operation of at least one physical component of computer hardware architecture or microarchitecture which is absolutely and unequivocally essential and required to specifically perform computer operations for the commutative operations;

further wherein the system requires operation of at least one physical component of computer hardware architecture or microarchitecture which is absolutely and unequivocally essential and required to specifically perform computer operations for the modification and randomization of import tables and other lookup tables;

further wherein the physical, tangible, non-abstract computer hardware system comprises one or more of a central processing unit, an optical and/or magnetic disk drive for reading from and/or writing to CDs, diskettes, or other storage media, a non-volatile storage unit for storing data and program files, a network interface for connecting the system to a network, a system memory unit comprising both high-speed read only memory (ROM) and random access memory (RAM) for storing data, system control programs, and application programs loaded from a disk drive, a storage unit, and a network interface, a user interface, comprising one or more input devices and a display, a system clock and one or more internal buses for interconnecting the elements of the system, and further wherein the operation of the system is controlled primarily by programs stored in system memory and executed by CPU, and further wherein these programs comprise one or more of an operating system, a file handling system, and one or more application programs, a set of user interface procedures, a binary code modification engine for modifying and/or rearranging binary code and for applying scrambling transformations and obfuscation transformations, and one or more compilers, and further comprising at least one binary scrambling component for generating the scrambled binary output;

further wherein the physical, tangible, non-abstract computer hardware system is essential and required for providing security and protection against attacks by malware and computer viruses, and further wherein the system provides further security against Zero Day Malware;

further wherein the physical, tangible, non-abstract computer hardware system is essential and required for operation of a method of binary scrambling of COTS software, comprising thoroughly scrambling any protected program where source code is not available, further wherein the scrambling occurs every five seconds or at process launch;

further wherein the physical, tangible, non-abstract computer hardware system is essential and required for operation of a method of binary scrambling of COTS software, comprising thoroughly scrambling any protected program even if source code is unavailable;

further wherein the physical, tangible, non-abstract computer hardware system is essential and required for operation of a method of binary scrambling of COTS software, wherein the newly scrambled binary reduces the likelihood of a zero day ROP/JOP style virus successfully exploiting a vulnerable COTS binary from 100% to less than about 1 in 1 billion ($1 \times 10^{-9}$);

further wherein the physical, tangible, non-abstract computer hardware system further comprises at least one tool that is integrated into an existing cyberdefense platform, further wherein the tool comprises a disassembler that can reliably roundtrip a binary, or disassemble into some intermediate form and then reassemble;

further wherein the physical, tangible, non-abstract computer hardware system is essential and required for operation of a method of modeling a compilation process wherein one can accurately disassemble a high level program in such a manner to perform scrambling to defeat a cyberattack;

further wherein the physical, tangible, non-abstract computer hardware system is essential and required for operation of a disassembling process, further wherein the disassembling process comprises utilizing an emulated virtual machine to assist in describing the disassembling process; and further wherein the physical, tangible, non-abstract computer hardware system is essential and required for reducing, disabling and/or eliminating the unwanted effects of viruses, malware and other malicious code.

The foregoing descriptions of the embodiments of the present invention have been presented for purposes of illustration and description. They are not intended to be exhaustive or to limit the present invention to the precise forms disclosed. Although specific embodiments have been illustrated and described herein, a variety of alternate and/or equivalent implementations may be substituted for the specific embodiments shown and described without departing from the scope of the present disclosure. This application is intended to cover any adaptations or variations of the embodiments discussed herein.

The invention claimed is:

1. A physical, tangible, non-abstract computer system, the computer system comprising:
   a system memory unit storing instructions for:
   (i) performing a disassembling process from an on-disk or in-memory software binary to obtain a disassembled software,
   (ii) once disassembled, transforming the disassembled software into an intermediate format,
   (iii) applying binary scrambling transformations to transform the intermediate format into assembly, and
   (iv) compiling the assembly into a new scrambled binary, wherein the new scrambled binary is semantically equivalent to the on-disk or in-memory software binary before the disassembling process, and further wherein original functionality of the on-disk or in-memory software binary is preserved by the new scrambled binary after applying the binary scrambling transformations;
   wherein operation of the computer system is controlled by said instructions stored in the system memory unit and executed by a processor, the processor comprising a central processing unit (CPU), and the instructions comprising an operating system and a file handling system;
   the processor executing said instructions for performing the disassembling process from the on-disk or in-memory software binary, and once disassembled, transforming into the intermediate format, applying the binary scrambling transformations to transform into assembly, and compiling into the new scrambled binary,
   wherein the transforming into the intermediate format comprises register transfer language steps, further comprising creating a graph to depict how data flows through registers,
   further wherein the processor executes instructions for performing a partial disassembly, wherein the new scrambled binary reduces a frequency of a virus exploiting a Commercial, Off-the-Shelf Software binary, wherein the frequency of a virus exploiting the Commercial, Off-the-Shelf Software binary is less than 1 in 1 billion, further wherein measurement of the frequency is performed both experimentally and through mathematical analysis, further wherein the binary scrambling transformations comprise register reallocation, further wherein the binary scrambling transformations comprise substituting equivalent hardware registers, and further wherein substituting equivalent hardware registers requires substituting register eax on an x86 based CPU chip with register ebx on the x86 based CPU chip;

further wherein the binary scrambling transformations comprise reordering of functions, wherein layout order of the functions is randomized in said reordering of functions;

further wherein the binary scrambling transformations comprise introduction of no-ops, chaff code, and obfuscation code to create additional entropy, further wherein execution of the chaff code is a no-op, further wherein said execution of said chaff code specifically requires adding 100 and then subtracting 100 afterwards;

further wherein the binary scrambling transformations comprise substitution of alternative instructions to perform semantically equivalent operations, wherein said substitution of alternative instructions to perform said semantically equivalent operations specifically requires a substitution in which multiplication of X by 2 is substituted with an addition of X+X;

further wherein the binary scrambling transformations comprise changing the order of evaluation of expressions, commutative operations, and further wherein the binary scrambling transformations comprise modification and randomization of import tables and other lookup tables, wherein the layout of the import tables and other lookup tables is randomized;

wherein a net result of all the binary scrambling transformations is a scrambled binary output that performs same end functionality as the on-disk or in-memory software binary before the disassembling process, further wherein the disassembling process comprises utilizing an emulated virtual machine, wherein the emulated virtual machine is utilized to assist in the disassembling process and to model a compilation process, further wherein the emulated virtual machine specifically requires use of a Quick EMUlator (QEMU) virtual machine that emulates a chip's instruction set;

further wherein the computer system comprises a binary code modification engine modifying and rearranging binary code and applying scrambling transformations and obfuscation transformations, further wherein the computer system provides scrambling of a protected program where source code is not available, and further wherein the system provides scrambling of a program written that must be in a programming language selected from a list comprising C, C++, Pascal, Perl, Cobol, Java, and Python;

further wherein the scrambling occurs every five seconds or at process launch;

further wherein the computer system comprises at least one tool that is integrated into an existing cyberdefense platform, wherein the tool comprises a disassembler, wherein the disassembler is required to roundtrip a binary or disassemble the binary into an intermediate form and then reassemble;

further wherein the computer system comprises a nonvolatile storage unit for storing data and program files, a network interface for connecting the computer system to a network, wherein the network comprises the Internet, a system clock, an optical or magnetic disk drive for reading from or writing to diskettes or other storage media, a user interface, wherein the user interface comprises one or more input devices and a display, and one or more internal buses for interconnecting the elements of the system;

wherein operation of the computer system is required to be further controlled by the operating system, the file handling system, one or more application programs loaded from the optical or magnetic disk drive, a set of user interface procedures, and a binary code modification engine for modifying or rearranging binary code, further wherein the computer system comprises distributed computer components in a heterogeneous distributed computing environment, further wherein the heterogeneous distributed computing environment comprises one or more physical, non-abstract remote file servers, one or more physical, non-abstract computer servers, and one or more physical, non-abstract memory storage devices, wherein each of the one or more physical, non-abstract remote file servers, one or more physical, non-abstract computer servers, and one or more physical, non-abstract memory storage devices is accessible by the processor via a communication network, further wherein the communication network comprises the Internet; and wherein the system protects against attacks specifically caused by zero-day malware and computer viruses, wherein said attacks comprise attacks by attackers from remote locations.

* * * * *